United States Patent
Zhang et al.

(10) Patent No.: US 11,751,660 B2
(45) Date of Patent: *Sep. 12, 2023

(54) DIGITIZED ARTIFICIAL NAIL AND PRODUCTION METHOD

(71) Applicant: Zhejiang Xunshi Technology Co., Ltd, Shaoxing (CN)

(72) Inventors: Jing Zhang, Manhattan Beach, CA (US); Biqing Lu, Shaoxing (CN); Yong Chen, Shaoxing (CN); Tiantian Wang, Xinyang (CN); Weigang Jin, Shaoxing (CN); Ming Chen, Shaoxing (CN); Haiyan Feng, Shaoxing (CN)

(73) Assignee: Zhejiang Xunshi Technology Co., Ltd, Zheijang (CN)

(*) Notice: Subject to any disclaimer, the term of this patent is extended or adjusted under 35 U.S.C. 154(b) by 551 days.

This patent is subject to a terminal disclaimer.

(21) Appl. No.: 16/991,428

(22) Filed: Aug. 12, 2020

(65) Prior Publication Data
US 2021/0169197 A1  Jun. 10, 2021

(51) Int. Cl.
| | |
|---|---|
| *A45D 31/00* | (2006.01) |
| *B33Y 50/00* | (2015.01) |
| *B33Y 80/00* | (2015.01) |
| *G06T 17/00* | (2006.01) |
| *G06V 20/64* | (2022.01) |
| *A45D 29/00* | (2006.01) |

(52) U.S. Cl.
CPC ............. *A45D 31/00* (2013.01); *B33Y 50/00* (2014.12); *B33Y 80/00* (2014.12); *G06T 17/00* (2013.01); *G06V 20/653* (2022.01); *A45D 2029/005* (2013.01); *G06T 2207/30196* (2013.01); *G06T 2219/2021* (2013.01)

(58) Field of Classification Search
CPC .. A45D 31/00; A45D 2029/005; A45D 29/18; G06T 17/00; G06T 2219/2021; G06T 19/20; G06T 2207/30196; B33Y 80/00; B33Y 10/00; B33Y 40/20
See application file for complete search history.

(56) References Cited

U.S. PATENT DOCUMENTS

| | | | |
|---|---|---|---|
| 2006/0016455 A1* | 1/2006 | Ide | A45D 31/00 |
| | | | 132/200 |
| 2009/0092310 A1* | 4/2009 | Gifford | A61K 8/00 |
| | | | 382/141 |
| 2020/0135310 A1* | 4/2020 | Gedamu | G16H 10/65 |
| 2020/0221849 A1* | 7/2020 | Lin | A45D 29/00 |
| 2022/0047058 A1* | 2/2022 | Cochran | B29C 64/386 |
| 2022/0295965 A1* | 9/2022 | Hoang | G06T 7/50 |

* cited by examiner

*Primary Examiner* — Margaret G Mastrodonato
(74) *Attorney, Agent, or Firm* — Xuan Zhang (57) ABSTRACT

A production method of a digitized artificial nail for a nail of a user includes the steps of: (a) scanning the nail of the user to construct an irregular digitized user nail model; (b) data sampling to convert the irregular digitized user nail model into a regular digitized artificial nail model which is a regular three dimensional grid surface, and topology deformation of the regular three dimensional grid surface to form a digitized artificial nail model; (c) matching an artificial nail shape selected by the user with the digitized artificial nail model to obtain a desired artificial nail model; (d) customizing the digitized artificial nail model; and (e) three dimensional printing a digitized artificial nail in response to the digitized artificial nail model.

14 Claims, 10 Drawing Sheets

Prior Art

Figure 12

DIGITIZED ARTIFICIAL NAIL AND PRODUCTION METHOD

CROSS REFERENCE OF RELATED APPLICATION

This is a non-provisional application that claims priority to Chinese application number CN/201911233902.9, filing date Dec. 5, 2019, the entire contents of each of which are expressly incorporated herein by reference.

BACKGROUND OF THE PRESENT INVENTION

Field of Invention

The present invention relates to an artificial nail and its production method. More particularly, the present invention relates to a digitized artificial nail and its production method via a 3D printing technology.

Description of Related Arts

Artificial nail tips are known in nail art and extensions placed on top of a natural fingernail of a user to visually modify the shape of the fingernail, such that the artificial nail tips can make the fingers of the user look more graceful and longer so as to enhance an aesthetic hand form of the user.

Figure 11:
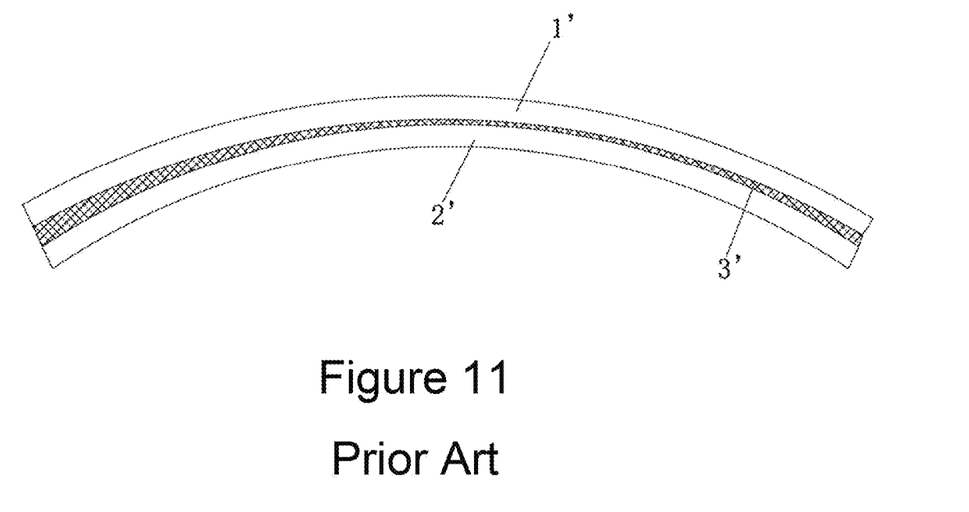
FIG. 11 shows the conventional artificial nail tip glued on a nail surface of a user.

However, the conventional artificial nail tips have the following drawbacks:

1. The size of the conventional artificial nail tips is standard and pre-formed so that the conventional artificial nail tip cannot perfectly match with the fingernail of the user. Therefore, the shape and length of the conventional artificial nail tip must be customized and trimmed by the manicurist with nail clippers according to the actual contour of the fingernail of the user.
2. The shape and curvature of the conventional artificial nail tip 1' (as shown in FIG. 11) cannot perfectly match with the curvature of the fingernail 2' of the user. Therefore, when glue 3' is applied between the artificial nail tip 1' and the fingernail 2', the glue 3' is unevenly distributed therebetween, so that the adhesion force of the glue is unevenly applied to the artificial nail tip 1' to damage the artificial nail tip 1' easily.
3. The fingernail of the user cannot be directly personalized and customized for nail art. Accordingly, an extension gel must be initially applied on the fingernail of the user to form the artificial nail tip. After curing and solidifying, the artificial nail tip must be removed from the fingernail of the user to make any style of nail art on the artificial nail tip. Otherwise, the nail art must be directly made on the fingernail of the user.

The conventional nail arts mainly formed by manually painting the nail art on the fingernail of the user by the manicurist or directly sticking a finished art sticker on the fingernail of the user. However, the color of the conventional nail art through the above methods is easy to fade, the gloss of the conventional nail art cannot last long, the conventional nail art is lack of 3D effect.

Therefore, in order to solve the above technical problems, a need exists for a digital nail art and its production method to overcome the above mentioned defects in the prior arts.

SUMMARY OF THE PRESENT INVENTION

In order to solve the above technical problems, the object of the present invention is to provide a digitized artificial nail and its production method having the advantages of low manufacturing cost, tailor making for a nail surface of a user, and convenient for styling.

Another object of the present invention is to provide a digitized artificial nail and its production method, wherein the artificial nail is digitized to form on the nail surface of the user.

In order to achieve the above objects, the production method of a digitized artificial nail on a nail surface of a user, comprises the steps of: 1) scanning the nail of the user; 2) data sampling and topology deformation of an artificial nail; 3) digitizing the artificial nail; 4) personalizing and customizing the artificial nail; and 5) three dimensionally printing the artificial nail.

According to the production method of the digitized artificial nail of the present invention, the step 1) is performed through a projection of a structured light to obtain user nail point cloud data of the nail of the user, so as to construct a digitized nail model of the nail of the user, wherein the step 1) further comprises the following steps.

(1-1) Project the structured light or fixed light by an optical instrument to scan the finger of the user so as to obtain scanned data of a finger model.

(1-2) Via a structured light projection camera, capture a user nail image of projection lines 1 on the nail 2 of the user, determine a plurality of three dimensional coordinates at different points on a nail surface of the user according to a curvature change of nail surface in the user nail image, obtain the irregular user nail point cloud data to construct an irregular digitized user nail model 3, that is, an irregular three dimensional grid.

According to the production method of the digitized artificial nail of the present invention, the above data is collected when the nail surface is retained and scanned in a stationary manner, and the data collection time is 3 seconds.

According to the production method of the digitized artificial nail of the present invention, the step (2) further comprises the following steps.

(2-1) At a predetermined sampling density, sample the irregular digitized user nail model established in the step (1) to obtain a new set of cloud points, i.e. by tracing the sampling points on the irregular digitized user nail model in the step (1), determine a plurality of intersections between the sampling points and a triangular face, so that new cloud point data are finally determined by the intersections to form a regular digitized artificial nail model, that is, a regular three dimensional grid surface.

(2-2) Duplicate the regular three dimensional grid surface 7 into multiple layers 8 for forming an artificial nail model having a predetermined thickness configuration, and topologically deform the top layer of the artificial nail model and keep a nail attachment layer unchanged in order to form a digitized artificial nail model capable of perfectly attaching onto the nail surface of the user.

According to the production method of the digitized artificial nail of the present invention, the step (3) further comprises a step of: matching an artificial nail shape selected by the user with the digitized artificial nail model in the step (2) to obtain a desired artificial nail model.

In other words, the digitized nail model is processed in the step (2) according to the intersection data to ensure the shape of the artificial nail closely matching with the nail shape of the user.

Accordingly, the data processing includes, but not limited to, moving the location of the intersection point, and zooming in and out thereof.

The data of the intersection point is the data of the outer layer in the digitized artificial nail model, wherein the nail attachment layer contacted with the nail surface of the user is remain unchanged.

According to the production method of the digitized artificial nail of the present invention, in the step (4), available customized digitized artificial nail includes, but not limited to, hollow style, three dimensional style, embossed style, or designed pattern.

According to the production method of the digitized artificial nail of the present invention, the step (5) further comprises a step of: after importing the designed nail data of the digitized artificial nail model into a computer with a printing software installed thereinto, printing the digitized artificial nail via a 3D printer.

According to the present invention, the production method of the digitized artificial nail further comprises a post processing step which comprises the following steps.

(6-1) Surface treatment: remove the digitized artificial nail from a printing platform of the 3D printer, remove any residue on the digitized artificial nail, cure and solidify the digitized artificial nail, and finally polish and smooth a top surface of the digitized artificial nail.

(6-2) Coloring: print an ink on the top surface of the digitized artificial nail by an UV printer, and cure and solidify the ink by an UV lamp to finally form an artificial nail tip.

According to the present invention, the production method of the digitized artificial nail further comprises a step of forming two chamfers along two longitudinal edges of the digitized artificial nail.

In order to achieve the above objectives, the digitized artificial nail is made by the production method and is configured to have two configurations, i.e. a chambered artificial nail and a non-chambered artificial nail.

According to the present invention, by using the adhesive with low adhesive force or heat process, the digitized artificial nail can be easily removed from the nail of the user, so that the digitized artificial nail can be repeatedly used.

According to the present invention, the production method of the digitized artificial nail further comprises a step of applying an adhesive at a nail chamber of the chambered artificial nail.

According to the present invention, the digitized artificial nail is printed on the nail surface layer by layer, wherein a printing thickness of the digitized artificial nail is gradually increased from a root of the nail to a tip thereof. The thickness of the digitized artificial nail is between 0.01 mm and 0.6 mm.

Comparing to the conventional artificial nail tip, the digitized artificial nail of the present invention has the following advantages:

1. The production method of the digitized artificial nail is incorporated with a three dimensional scanning method to sample the nail of the user in order to form a three dimensional digitized artificial nail model by topologically deformation to form the three dimensional grid. Then, through the digitized matching and 3D printing, the digitized artificial nail is formed with perfectly matching the nail of the user, minimum adhesive force, and easy to use, and the digitized artificial nail is reusable.
2. Through the production method of the digitized artificial nail, a gap between the digitized artificial nail of the present invention and the nail of the user is relatively uniform and integrally formed with chamber to receive the adhesive. Therefore, the forces can evenly exerted on the digitized artificial nail. By using the adhesive with low adhesive force or heat process, the digitized artificial nail can be easily removed from the nail of the user without damaging the digitized artificial nail, so that the digitized artificial nail can be repeatedly used.
3. The production method of the digitized artificial nail is incorporated with a three dimensional printing technology, wherein the digitized artificial nail is integrally formed in a one piece manner. The shape and size of the digitized artificial nail is adjustable and varied with any further trimming process by the manicurist. Therefore, the digitized artificial nail is convenient for use, is easy to make in low cost, and is rapidly made. The digitized artificial nail can meet different personalized preferences of different users, and can be worn repeatedly.
4. The digitized artificial nail is manufactured in low cost, and the manufacturing speed is fast, and can meet individual preference.

DETAILED DESCRIPTION OF THE PREFERRED EMBODIMENT

Referring to FIGS. 1 to 10 and 12 of the drawings, the present invention provides a production method of a digitized artificial nail as a nail tip for a nail surface of a user, wherein the production method comprises the following steps.

Figure 1:
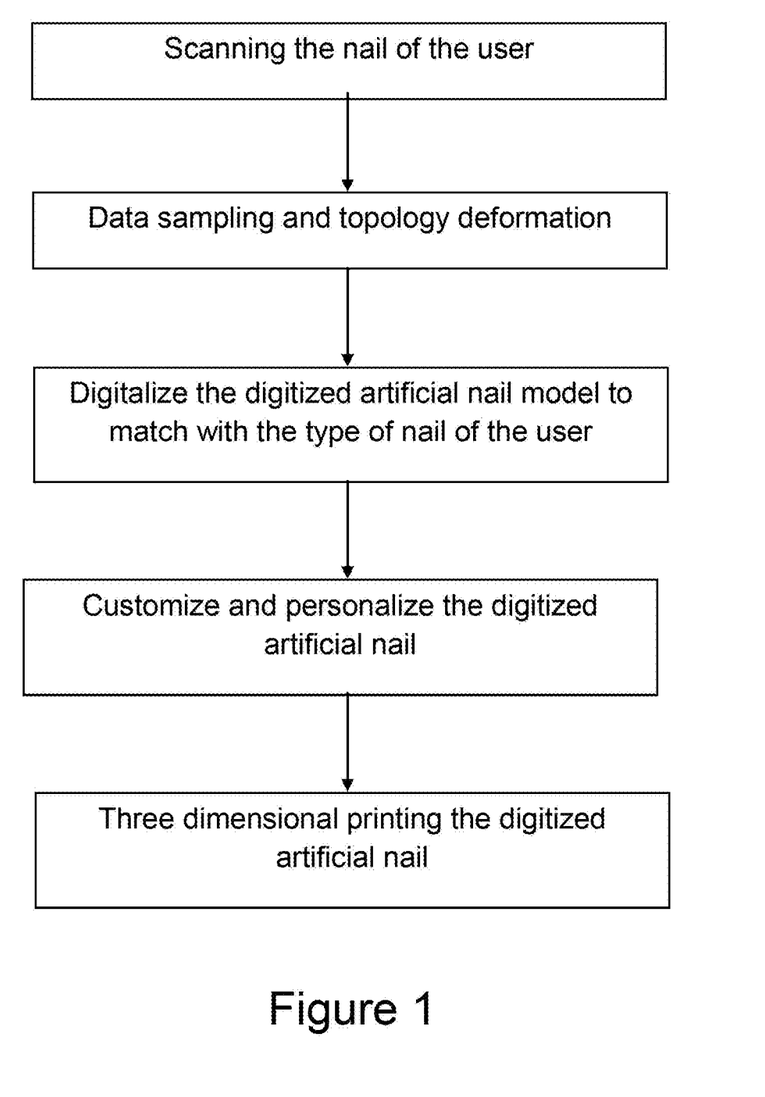
FIG. 1 is a flow diagram showing a production method of a digitized artificial nail according to a preferred embodiment of the present invention.
Figure 2:
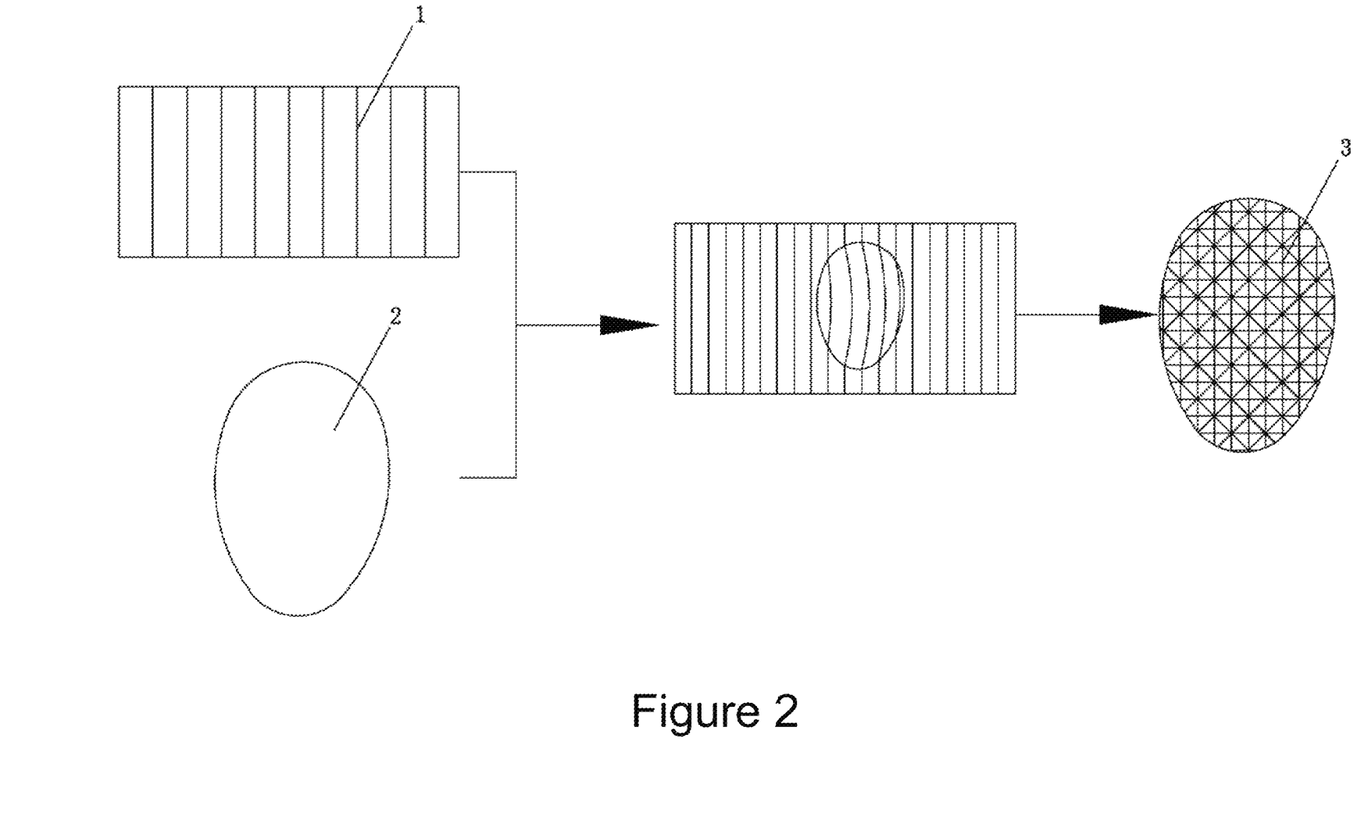
FIG. 2 is a flow chart showing the light projection on a nail surface in step 1) of the production method the digitized artificial nail according to the above preferred embodiment of the present invention.

(1) Scanning the nail of the user.

The nail of the user has the following properties: stiffness; the basic color tones of finger and nail are relatively close; basic curvature of the nail surface, uneven nail surface, such as bump on the nail surface. Therefore, in this step, through the projection of structured light, point cloud data of the nail of the user is obtained to construct a digitized nail model of the nail by the following steps.

(1-1) Project the structured light or fixed light by an optical instrument to scan the finger of the user so as to obtain scanned data of a finger model.

Figure 3:
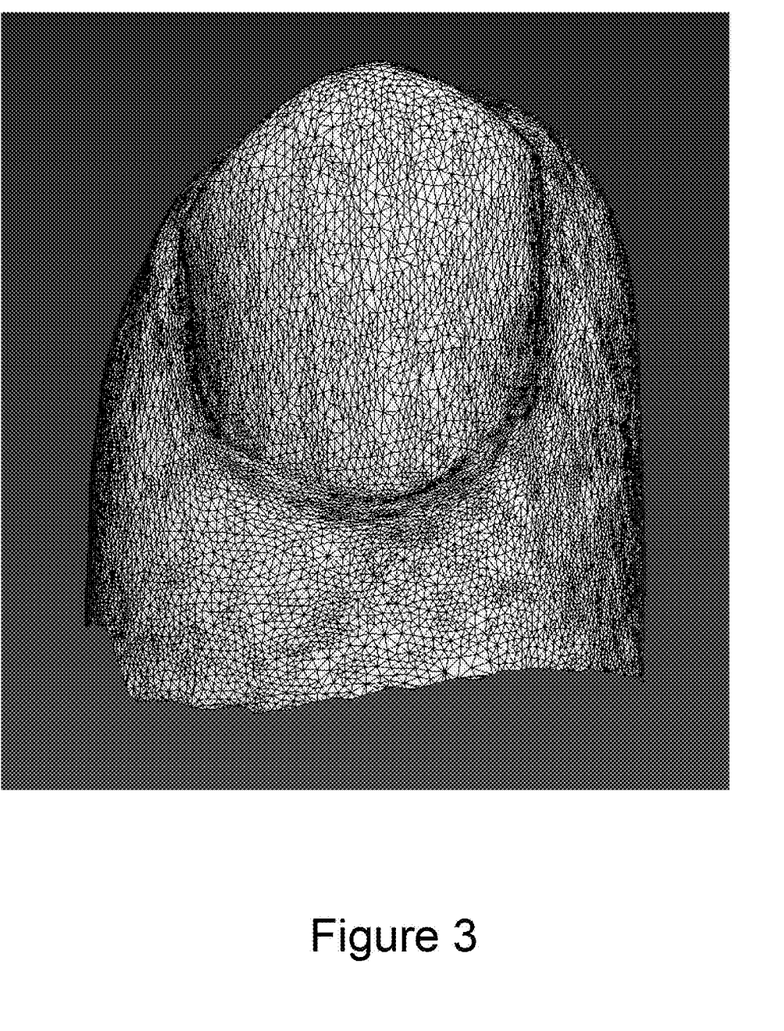
FIG. 3 shows the irregular data of the digital modeling in step (1) of the production method the digitized artificial nail according to the above preferred embodiment of the present invention.

(1-2) Via a structured light projection camera, capture a user nail image of projection lines 1 on the nail 2 of the user, determine a plurality of three dimensional coordinates at different points on a nail surface of the user according to a curvature change of nail surface in the user nail image, obtain the irregular user nail point cloud data to construct an irregular digitized user nail model 3, that is, an irregular three dimensional grid.

The above data is collected when the nail surface is retained and scanned in a stationary manner, and the data collection time, i.e. the scanning time, is 3 seconds so that the data collection speed is relatively fast.

Furthermore, since the user nail has a single color or monochrome, the contrast of the projected structured light can be effectively adjusted to enhance the scanning accuracy of the user nail.

Figure 4:
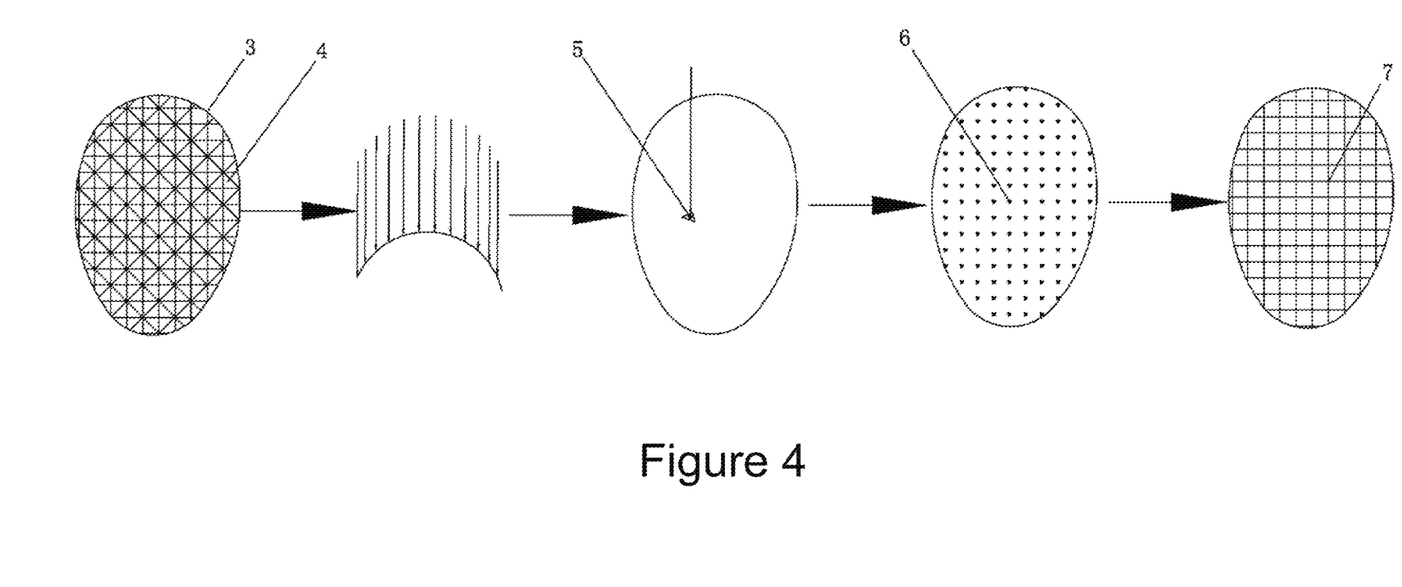
FIG. 4 is a flow chart showing the step (2-1) of the production method the digitized artificial nail according to the above preferred embodiment of the present invention.
Figure 5:
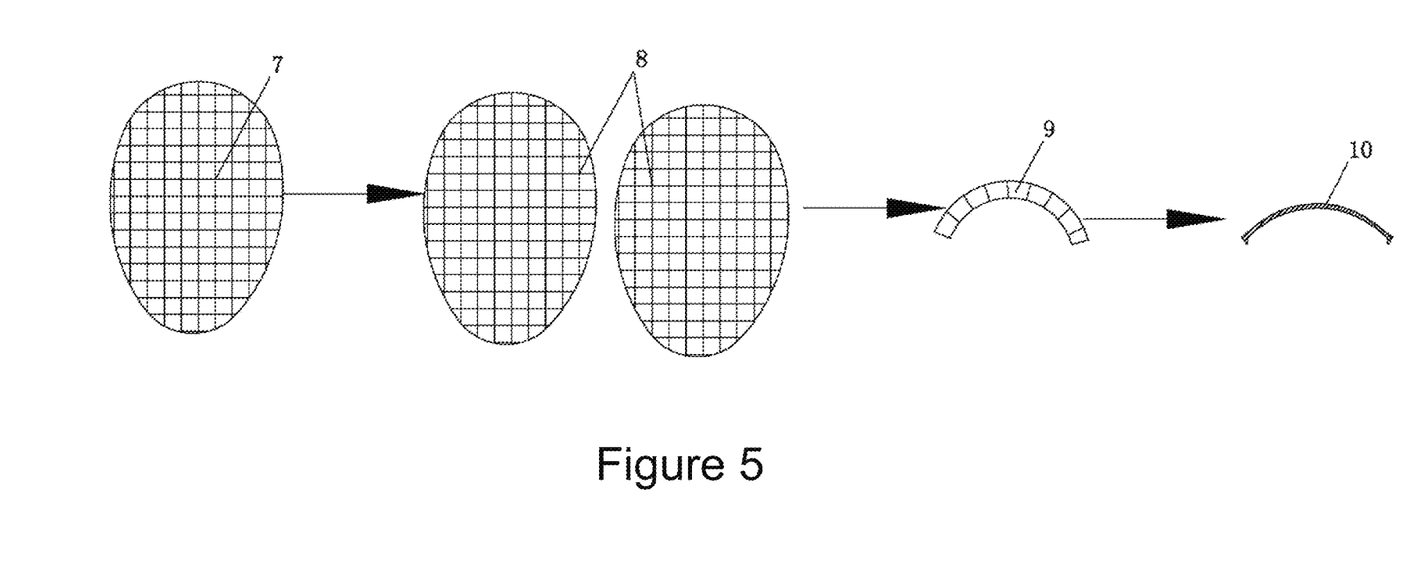
FIG. 5 is a flow chart showing the step (2-2) of the production method the digitized artificial nail according to the above preferred embodiment of the present invention.

(2) Data sampling and topology deformation, which comprises the following steps.

Figure 6:
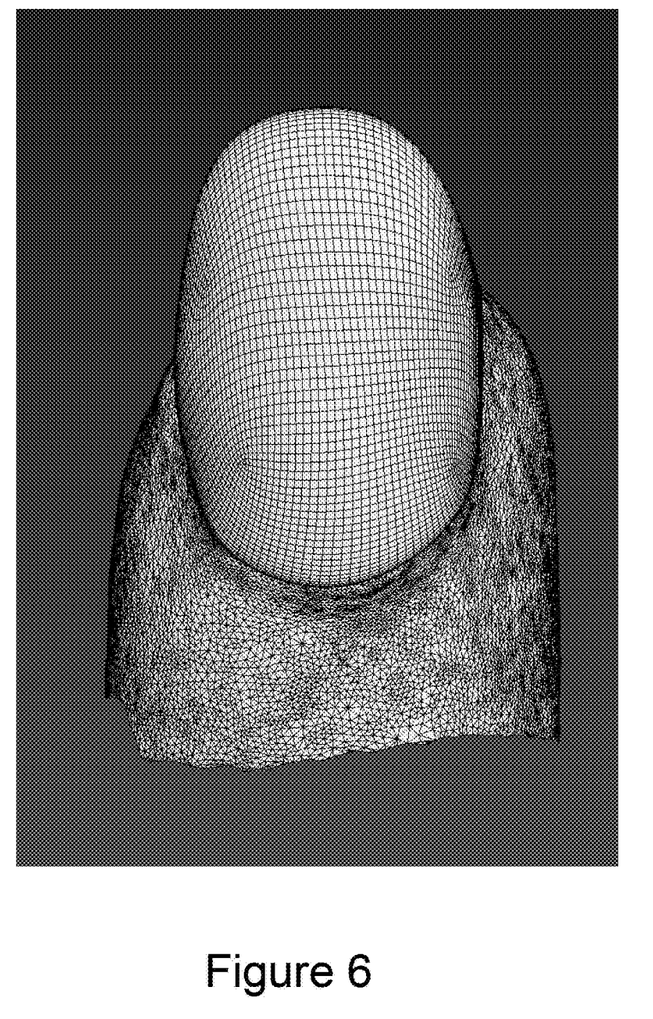
FIG. 6 shows the irregular data of the digital modeling in step (2) of the production method the digitized artificial nail according to the above preferred embodiment of the present invention.
Figure 7:
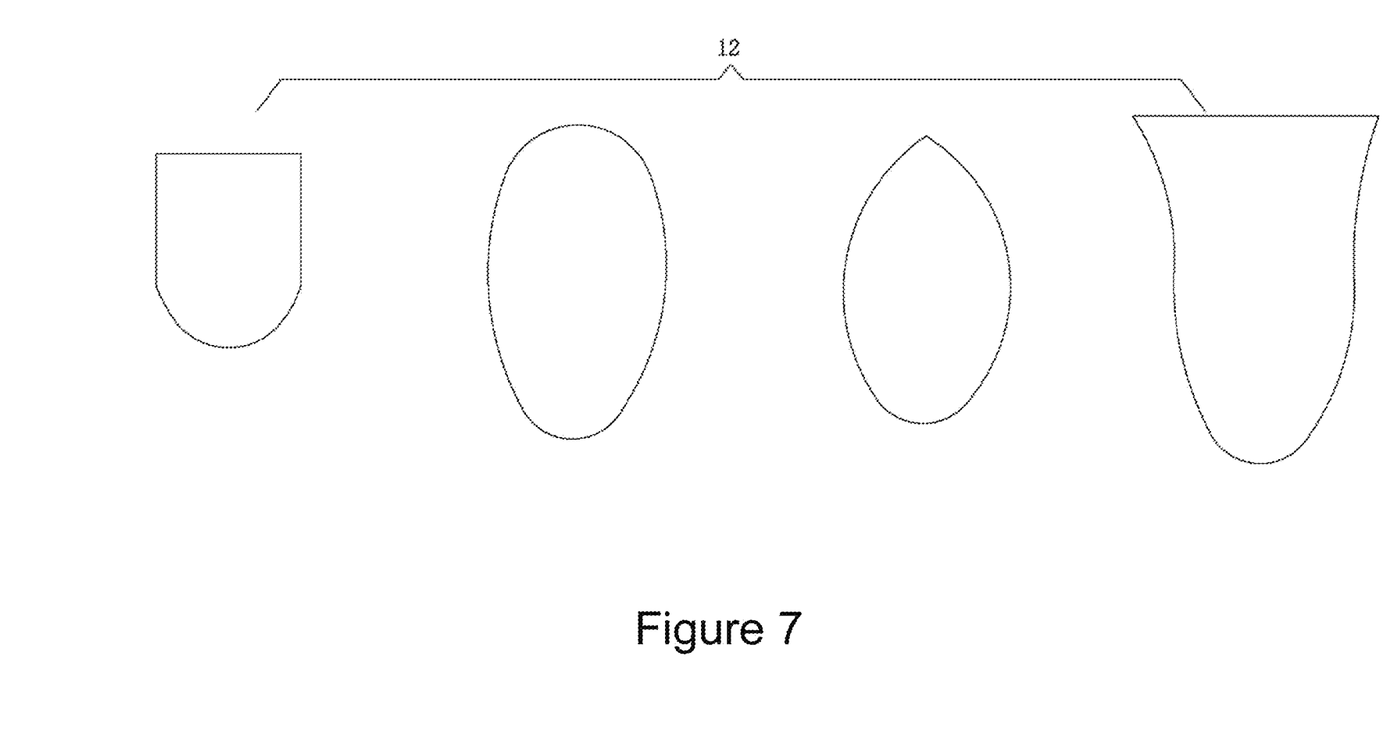
FIG. 7 is a schematic diagram showing nail type in the step (3) of the production method the digitized artificial nail according to the above preferred embodiment of the present invention.

(2-1) Collect sampling points as sampling density during the data sampling. In the step (1), since the irregular digitized user nail model 3 is constructed as the irregular three dimensional grid, the nail surface of the user is constructed to have a plurality of points arranged in a regular manner. In other words, the points are aligned and arranged under a predetermined guideline. Therefore, at a predetermined sampling density, the irregular digitized user nail model 3 established in the step (1) is sampled to obtain a new set of cloud points. That is, by tracing the sampling points on the irregular digitized user nail model 3 in the step (1), determine a plurality of intersections between the sampling points 4 and a triangular face 5, so that new cloud point data 6 are finally determined by the intersections to form a regular digitized artificial nail model 7, that is, a regular three dimensional grid surface. In other words, the data sampling is configured to convert the irregular digitized user nail model 3 into the regular digitized artificial nail model 7.

(2-2) Duplicate the regular three dimensional grid surface 7 into multiple layers 8, i.e. including a top layer and a bottom layer, for forming an artificial nail model 9 having a predetermined thickness configuration, and topologically deform the top layer of the artificial nail model 9 and keep a nail attachment layer, i.e. the bottom layer, unchanged in order to form a digitized artificial nail model 10 capable of perfectly attaching onto the nail surface of the user. In other words, a curvature of the nail attachment layer of the artificial nail model 9 is configured to perfectly match with a curvature of the nail of the user while a curvature of the top layer of the artificial nail model 9 can be selectively adjusted by the user. Preferably, the curvature of the nail attachment layer of the artificial nail model 9 should match with the curvature of the nail attachment layer thereof, so that the thickness of the artificial nail model 9 with respect to a width thereof is uniform.

Figure 8:
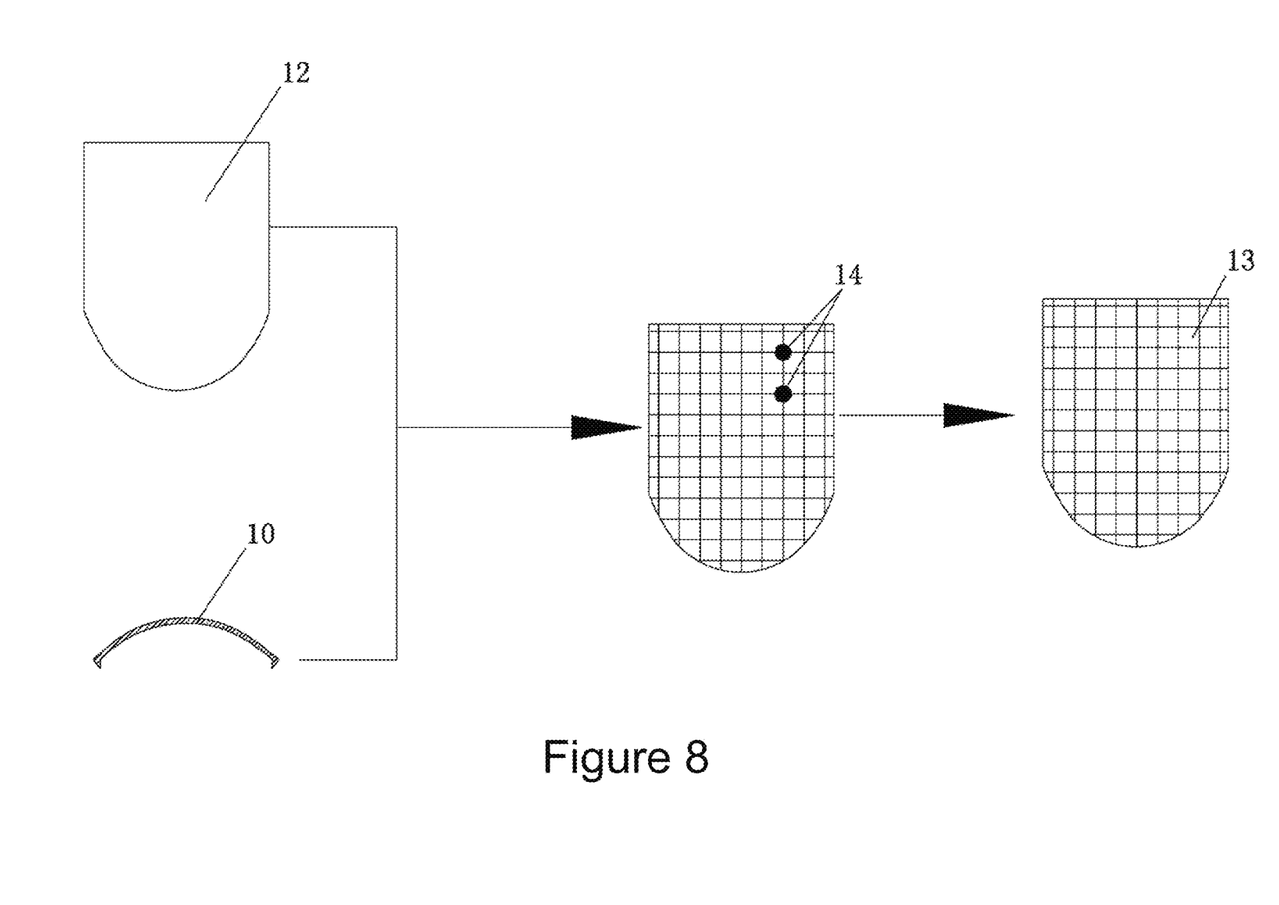
FIG. 8 is a flow chart showing the step (3) of the production method the digitized artificial nail according to the above preferred embodiment of the present invention.

(3) Digitalize the digitized artificial nail model 10 to match with the nail shape selected by the user.

In this step, match an artificial nail shape 12 (the nail shape shown in FIG. 7 includes, but not limited to, French nail shape, oval nail shape, pointed nail shape, or "Shamete" nail shape) according to the selection of the user with the digitized artificial nail model 10 in the step (2) to obtain a desired artificial nail model 13. In other words, the digitized nail model is processed in the step (2) according to the intersection data to ensure the shape of the artificial nail closely matching with the nail shape of the user. Therefore, once the artificial nail shape 12 is selected, the curvatures of the nail attachment layer and the top layer are predetermined.

Accordingly, the data processing includes, but not limited to, moving the location of the intersection point 14, and zooming in and out thereof.

The data of the intersection point is the data of the outer layer in the digitized artificial nail model, wherein the nail attachment layer contacted with the nail surface of the user is remain unchanged.

(4) Customize and personalize the digitized artificial nail model. Available customized digitized artificial nail includes, but not limited to, hollow style, three dimensional style, embossed style, or designed pattern.

(5) Three dimensional printing, wherein the 3D printing process is configured to:

import the designed nail data of the digitized artificial nail model into a computer with a printing software installed thereinto, and print the digitized artificial nail via a 3D printer. The digitized artificial nail is 3D-printed layer by layer, wherein a printing thickness of the digitized artificial nail is gradually increased from a root to tip with respect to a root of the nail to a tip thereof. In one example, a thickness of the digitized artificial nail is between 0.01 mm and 0.6 mm.

(6) Post processing, wherein the post processing comprises the following steps.

(6-1) Surface treatment: remove the digitized artificial nail from a printing platform of the 3D printer, remove any residue on the digitized artificial nail, cure and solidify the digitized artificial nail, and finally polish and smooth a top surface of the digitized artificial nail.

(6-2) Coloring: print an ink on the top surface of the digitized artificial nail by an UV printer, and cure and solidify the ink by an UV lamp to finally form an artificial nail tip.

Figure 9:
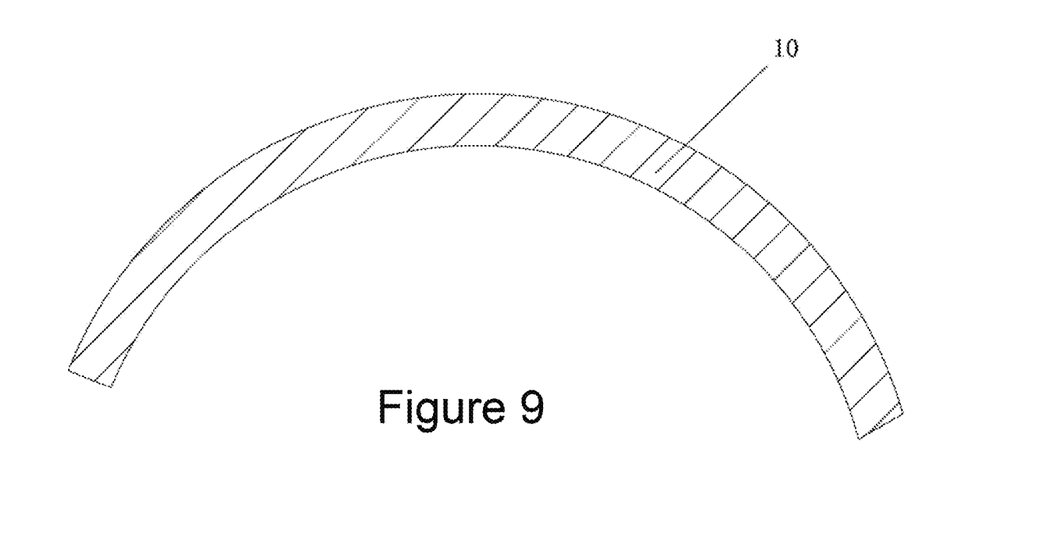
FIG. 9 is a schematic diagram of a non-chambered artificial nail according to the above preferred embodiment of the present invention.
Figure 10:
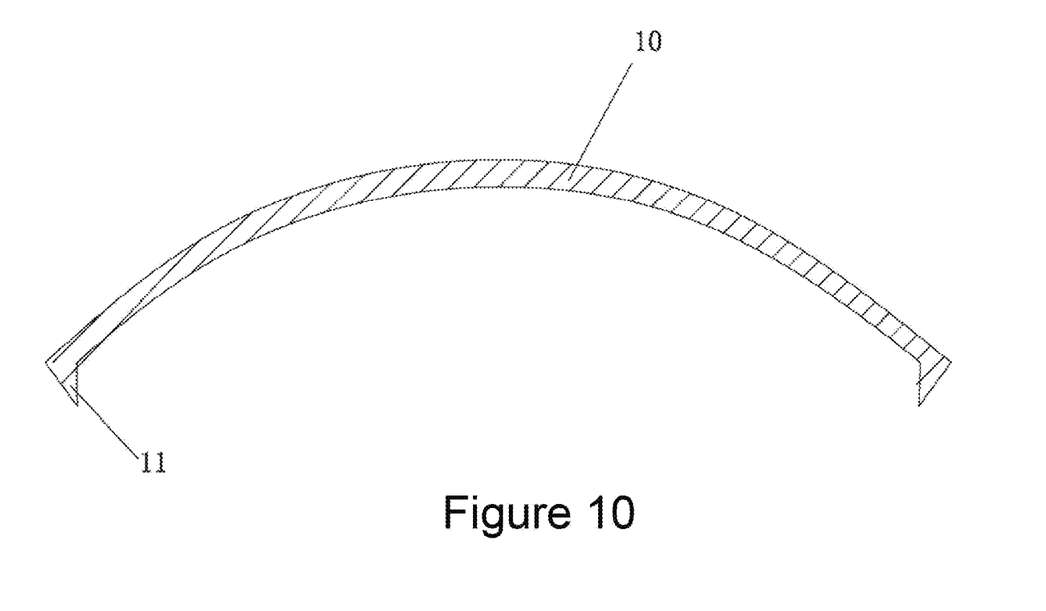
FIG. 10 is a schematic diagram of a chambered artificial nail according to the above preferred embodiment of the present invention.
Figure 12:
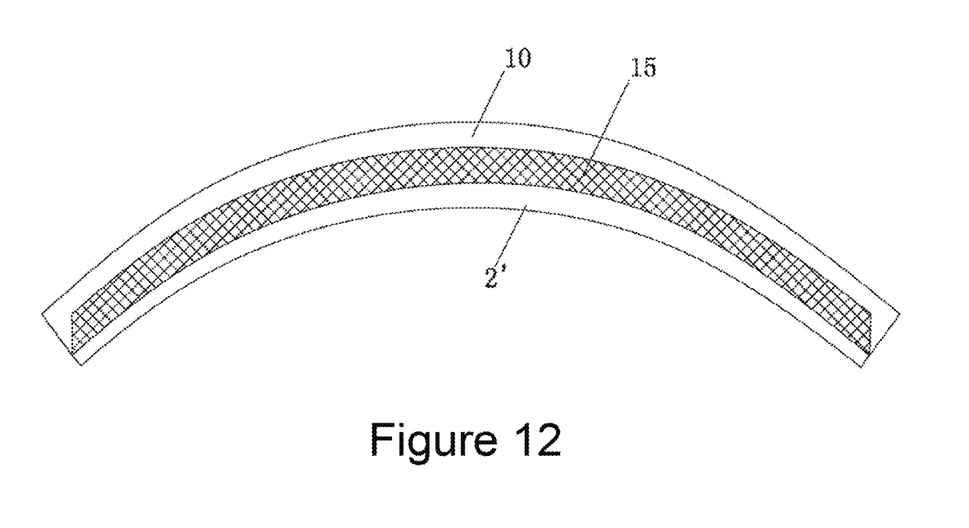
FIG. 12 shows the chambered artificial nail glued on a nail surface of a user according to the above preferred embodiment of the present invention.

According to the present invention, the digitized artificial nail is made by the production method and is configured to have two configurations, i.e. a chambered artificial nail and a non-chambered artificial nail, wherein the chambered artificial nail has a nail chamber receiving an adhesive 15 therein to easy bonding and to minimize a bonding force to the nail. In other words, the adhesive 15 is applied and retained on the nail attachment layer of the digitized artificial nail.

Furthermore, hangnails are jagged pieces of skin jut out on the side of the nail of the user. Therefore, the digitized artificial nail of the present invention further comprises two chamfers 11 integrally protruded along two longitudinal edges of the digitized artificial nail respectively during the 3D printing, wherein the chamfers 11 are configured to fit and match with the nail structure so as to eliminate any discomfort for the user when the digitized artificial nail is attached onto the nail.

A gap between the digitized artificial nail of the present invention and the nail 2' of the user is relatively uniform and integrally formed with chamber to receive the adhesive. Therefore, the forces can evenly exerted on the digitized artificial nail. By using the adhesive with low adhesive force or heat process, the digitized artificial nail can be easily removed from the nail of the user without damaging the digitized artificial nail, so that the digitized artificial nail can be repeatedly used.

Using the above mentioned production method to make the digitized artificial nail of the present invention, the digitized artificial nail can be worn and replaced according to the user preference such as clothing, color, mode, location, etc, wherein the digitized artificial nail of the present invention is reusable.

The above description is only the preferred embodiment of the present invention, and is not intended to be limiting. The present invention should include all modifications, equivalent substitutions and improvements made within the spirit and principles of the present invention.

What is claimed is:

1. A production method of a digitized artificial nail for a nail of a user, comprising the steps of:
    (a) scanning the nail of the user to construct an irregular digitized user nail model by the steps of:
    (a.1) projecting structure light on a finger of the user including a nail surface thereof to obtain scanned data of a finger model;
    (a.2) using the structure light to capture a user nail image presented by projection lines on the nail surface;
    (a.3) determining a plurality of three dimensional coordinates at different points on a nail surface of the user according to a curvature change of a nail surface in said user nail image; and
    (a.4) obtaining irregular user nail point cloud data via said structured light to construct said irregular digitized user nail model which is presented as an irregular three dimensional grid;
    (b) data sampling to convert said irregular digitized user nail model into a regular digitized artificial nail model which is a regular three dimensional grid surface, and topology deformation of said regular three dimensional grid surface to form a digitized artificial nail model;
    (c) matching an artificial nail shape selected by the user with said digitized artificial nail model;
    (d) customizing the digitized artificial nail model; and
    (e) three dimensional printing a digitized artificial nail in response to said digitized artificial nail model.

2. The production method, as recited in claim 1, wherein, in the step (a.4), as said irregular digitized user nail model is constructed as said irregular three dimensional grid, the nail surface of the user is constructed to have the points arranged in a regular manner, such that the points on the nail surface are aligned and arranged in a predetermined guideline.

3. The production method, as recited in claim 2, wherein, in the step (a.1), the finger of the user is retained and scanned in a stationary manner, and a data collection time is 3 seconds.

4. The production method, as recited in claim 2, wherein the step (a.1) further comprises a step of adjusting a contrast of said structured light according to a color of the nail of the user in order to determine the nail surface at the finger of the user.

5. The production method, as recited in claim 1, wherein the step (b) comprises the steps of:
    (b.1) at a predetermined sampling density, sampling said irregular digitized user nail model to obtain a new set of cloud points for forming said regular digitized artificial nail model by the steps of:
    tracing a plurality of sampling points as the sample density on the irregular digitized user nail model; and
    determining a plurality of intersections between the sampling points and a triangular face, so that the new cloud point data are finally determined by the intersections to form the regular digitized artificial nail model; and
    (b.2) duplicating said regular three dimensional grid surface into multiple layers for forming said artificial nail model having a predetermined thickness configuration, and topologically deforming a top layer of the artificial nail model, and retaining a bottom layer of the artificial nail model as a nail attachment layer having a curvature matching with a curvature of the nail surface.

6. The production method, as recited in claim 1, wherein the step (e) comprises the steps of:
    (e.1) importing designed nail data of said digitized artificial nail model into a computer with a printing software installed thereinto; and
    (e.2) printing said digitized artificial nail via a 3D printer.

7. The production method, as recited in claim 6, wherein the step (e.2) further comprises a step of: integrally, perpendicularly, and downwardly protruding two chamfers along two longitudinal edges of said digitized artificial nail respectively.

8. The production method, as recited in claim 6, wherein, in the step (e.2), said digitized artificial nail is 3D-printed layer by layer, wherein a printing thickness of said digitized artificial nail is gradually increased from a root to tip.

9. The production method, as recited in claim 1, further comprising a step (f) of post processing said digitized artificial nail which comprises the steps of:
    (f.1) surfacing treating said digitized artificial nail by removing a residue on said digitized artificial nail, and polishing a top surface of said digitized artificial nail; and
    (f.2) coloring said top surface of said digitized artificial nail via an UV printer.

10. The production method, as recited in claim 1, further comprising a step of applying an adhesive on said digitized artificial nail for bonding said digitized artificial nail on the nail of the user.

11. The production method, as recited in claim 1, wherein a thickness of said digitized artificial nail is between 0.01 mm and 0.6 mm.

12. The production method, as recited in claim 1, wherein said digitized artificial nail is a non-chambered artificial nail.

13. The production method, as recited in claim 1, wherein said digitized artificial nail is a chambered artificial nail having an adhesive chamber formed between top and bottom layers of the digitized artificial nail for receiving an adhesive thereat.

14. The production method, as recited in claim 1, wherein said digitized artificial nail is reusable.

* * * * *